(12) United States Patent
Standridge (10) Patent No.: US 7,327,686 B2
(45) Date of Patent: Feb. 5, 2008

(54) GENERATING PROCESSED TRAFFIC

(75) Inventor: Roger Standridge, Los Angeles, CA (US)

(73) Assignee: IXIA, Calabasas, CA (US)

( * ) Notice: Subject to any disclaimer, the term of this patent is extended or adjusted under 35 U.S.C. 154(b) by 902 days.

(21) Appl. No.: 10/706,404

(22) Filed: Nov. 12, 2003

(65) Prior Publication Data
US 2005/0099959 A1 May 12, 2005

(51) Int. Cl.
*H04J 3/14* (2006.01)
(52) U.S. Cl. ...................................... 370/241
(58) Field of Classification Search ........ 370/241–250, 370/252, 253; 709/223–226; 714/100, 25–40, 714/45–47
See application file for complete search history.

(56) References Cited

U.S. PATENT DOCUMENTS

| | | | |
|---|---|---|---|
| 5,247,517 A | | 9/1993 | Ross et al. |
| 5,343,463 A | | 8/1994 | van Tetering et al. |
| 5,450,394 A | | 9/1995 | Gruber |
| 5,477,531 A | | 12/1995 | McKee |
| 5,787,253 A | | 7/1998 | McCreery et al. |
| 5,838,919 A | * | 11/1998 | Schwaller et al. .......... 709/224 |
| 5,878,032 A | | 3/1999 | Mirek et al. |
| 6,044,091 A | | 3/2000 | Kim |
| 6,108,800 A | | 8/2000 | Asawa |
| 6,167,534 A | * | 12/2000 | Straathof et al. .............. 714/38 |
| 6,173,333 B1 | | 1/2001 | Jolitz |
| 6,233,256 B1 | | 5/2001 | Dieterich et al. |
| 6,272,450 B1 | * | 8/2001 | Hill et al. ...................... 703/13 |
| 6,279,124 B1 | | 8/2001 | Brouwer |
| 6,321,264 B1 | | 11/2001 | Fletcher |
| 6,360,332 B1 | * | 3/2002 | Weinberg et al. ............... 714/4 |
| 6,363,056 B1 | | 3/2002 | Beigi et al. |
| 6,397,359 B1 | * | 5/2002 | Chandra et al. ............ 714/712 |
| 6,515,967 B1 | * | 2/2003 | Wei et al. .................... 370/244 |
| 6,526,259 B1 | | 2/2003 | Ho |
| 6,545,979 B1 | | 4/2003 | Poulin |
| 7,020,284 B2 | * | 3/2006 | Boykin et al. .............. 380/200 |
| 7,167,820 B2 | * | 1/2007 | Sarfati et al. .................. 703/13 |
| 2003/0208616 A1 | * | 11/2003 | Laing et al. ................. 709/236 |
| 2003/0231741 A1 | | 12/2003 | Rancu et al. |
| 2004/0105392 A1 | * | 6/2004 | Charcranoon ................ 370/252 |
| 2004/0236866 A1 | * | 11/2004 | Dugatkin et al. ........... 709/235 |
| 2005/0099959 A1 | * | 5/2005 | Standridge ................... 370/252 |

* cited by examiner

*Primary Examiner*—Dmitry Levitan
(74) *Attorney, Agent, or Firm*—SoCal IP Law Group LLP; Steven C. Sereboff (57) ABSTRACT

There is disclosed methods and apparatus for generation of processed traffic. An environment may include a traffic generator, a network, a gateway and a traffic receiver. The abilities of the gateway may be tested by generating traffic from the traffic generator and transmitting it to the traffic receiver via the network and the gateway. Time constraints of processor-intensive processing may be avoided by holding or looping back traffic from the traffic generator so that the traffic may be transmitted as needed for a test.

32 Claims, 5 Drawing Sheets

GENERATING PROCESSED TRAFFIC

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

BACKGROUND OF THE INVENTION

1. Field of the Invention

The present invention relates to generating processed traffic.

2. Description of Related Art

Networks such as the Internet provide a variety of data communicated using a variety of network devices including servers, routers, hubs, switches, and other devices. Before placing a network into use, the network, including the network devices included therein, may be tested to ensure successful operation. Network devices may be tested, for example, to ensure that they function as intended, comply with supported protocols, and can withstand anticipated traffic demands.

To assist with the construction, installation and maintenance of networks and network devices, networks may be augmented with network analyzing devices, network conformance systems, network monitoring devices, and network traffic generators, all which are referred to herein as network testing systems. The network testing systems may allow for the sending, capturing and/or analyzing of network communications.

Current network traffic analysis tools and traffic generation systems exist as separate entities. Several techniques for gathering and analyzing network data exist. These techniques include direct playback of recorded data and synthetic generation of packet based traffic.

Rapid advances in communication technology have accentuated the need for security in IP networks such as the Internet. To solve this problem, the IP Security Protocol (IPSEC) has been developed. IPSEC includes mechanisms to protect client protocols of IP and operates at the IP layer. IPSEC is a security protocol in the network layer which provides cryptographic security services that flexibly support combinations of authentication, integrity, access control and confidentiality. Work on IPSEC has focused on improvement of the Internet Key Exchange (IKE) and encapsulation protocols.

IPSEC uses strong cryptography to provide both authentication and encryption services. Authentication ensures that packets are from the right sender and have not been altered in transit. Encryption prevents unauthorized reading of packet contents. These services allow secure tunnels through untrusted networks to be built. Everything passing through the untrusted network is encrypted by an IPSEC gateway and decrypted by a gateway at the other end. The result is a Virtual Private Network (VPN). This is a network which is effectively private even though it includes machines at several different sites connected by the insecure Internet.

The IPSEC protocols were developed by the IETF (Internet Engineering Task Force), and it is believed that they will be required as part of IP Version Six. They are also being widely implemented for IP Version Four. In particular, nearly all vendors of any type of firewall or security software have IPSEC support either shipping or in development.

In an IPSEC tunnel, the relevant players are the endpoints (hosts) and the gateways. Traffic between hosts and gateways is clear, application data. That between gateways is subject to a series of operations described as the properties of the tunnel (authentication, encryption, encapsulation). In simplistic terms, an IPSEC VPN can be viewed as a combination of a left endpoint, a left gateway, a right gateway and a right endpoint.

Once an IPSEC tunnel has been established, traffic originating from the left endpoint and destined for the right is sent clear to the left gateway where it is processed/encapsulated and forwarded to the right gateway. The right gateway likewise processes and decapsulates it before sending the original clear traffic on to the right endpoint.

DETAILED DESCRIPTION OF THE INVENTION

Throughout this description, the embodiments and examples shown should be considered as exemplars, rather than limitations on the apparatus and methods of the present invention.

Description of the System

Figure 1:
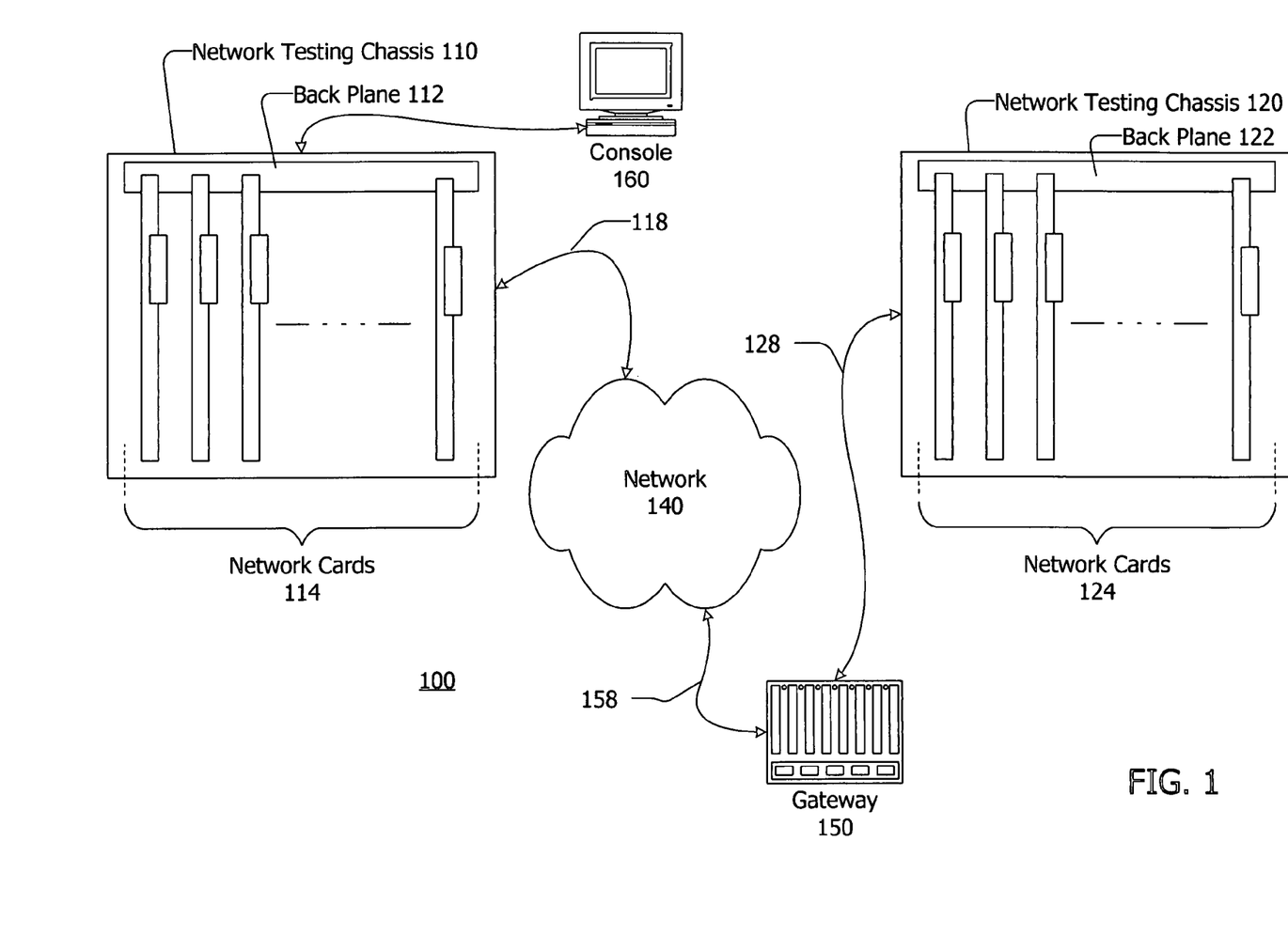
FIG. 1 is a block diagram of a first environment for generating processed traffic.

Referring to FIG. 1, there is shown a block diagram of an environment 100 for generating processed traffic. The environment 100 includes a traffic generator 110, a traffic receiver 120, a console 160, a gateway 150 and a network 140 to which the traffic generator 110 and the gateway 150 may be coupled.

The traffic generator 110 may simulate (1) a host or network of hosts and/or (2) a gateway to the network 140. The traffic receiver 120 may simulate a host or network of hosts. The traffic generator 110 generates traffic from one or more simulated hosts to the simulated hosts of the traffic receiver 120. The traffic generator 110 also simulates a gateway which encrypts and encapsulates the traffic. The gateway 150 decapsulates and decrypts the traffic and transmits the traffic to the traffic generator 120. VPN tunnels may be established between the traffic generator 110 and the gateway 150.

The network 140 may be a local area network (LAN), a wide area network (WAN), a storage area network (SAN), or a combination of these. The network 140 may be wired, wireless, or a combination of these. The network 140 may include or be the Internet, and may support Internet Protocol (IP) traffic. The network 140 may be public or private, and may be a segregated test network. The network 140 may be comprised of numerous nodes providing numerous physical and logical paths for data to travel. The network 140 may be physically insecure.

Communications on the network 140 may take various forms, including frames, cells, datagrams, packets or other units of information, all of which are referred to herein as data units. There may be plural logical communications links between the traffic generator 110 and the traffic receiver 120.

The gateway 150 may be a router, switch, VPN gateway or other communication interface capable of receiving traffic from the network 140 and passing the traffic to the traffic receiver 120. The gateway 150 may be a single device or system of devices. The gateway 150 may have other capabilities. The gateway 150 and the traffic generator 110 may be directly connected. Likewise, the gateway 150 and the traffic receiver 120 may be directly connected. Alternatively, there may be a physically secure network between the gateway 150 and the traffic receiver 120. Other alternatives are possible.

The traffic generator 110 and the traffic receiver 120 may include or be one or more of a traffic generator, a performance analyzer, a conformance validation system, a network analyzer, a network management system, and/or others. The traffic generator 110 and the traffic receiver 120 may include an operating system such as, for example, versions of Linux, Unix and Microsoft Windows. The traffic generator 110 and traffic receiver 120 may include one or more network cards 114, 124 and back planes 112, 122. The traffic generator 110 and the traffic receiver 120 and/or one or more of the network cards 114, 124 may be coupled to the network 140 via one or more connections 118, 128. The connections 118, 128 may be wired or wireless.

The traffic generator 110 and the traffic receiver 120 may be in the form of a card rack, as shown in FIG. 1, or may be an integrated unit. Alternatively, the traffic generator 110 and the traffic receiver 120 may each comprise a number of separate units cooperating to provide traffic generation, traffic and/or network analysis, network conformance testing, and other tasks.

The console 160 may be connected to the traffic generator 110 to provide application layer control of the traffic generator 110. The console 160 may be a PC, workstation or other device. The console 160 may provide a high level user interface such as a GUI. The console 160, or a like device, may also be coupled to the traffic receiver 120 to provide application layer control of the traffic receiver 120.

The console 160 may be used to set up tens of thousands of tunnels with user-variable parameters and then send real Layer 4-7 traffic over the tunnels. By creating these real-world scenarios, users can validate tunnel capacity, tunnel set up rates, as well as validate data performance over the tunnels.

The traffic generator 110, the traffic receiver 120 and the network cards 114, 124 may support one or more higher level communications standards or protocols such as, for example, the User Datagram Protocol (UDP), Transmission Control Protocol (TCP), Internet Protocol (IP), Internet Control Message Protocol (ICMP), Hypertext Transfer Protocol (HTTP), address resolution protocol (ARP), reverse address resolution protocol (RARP), file transfer protocol (FTP), Simple Mail Transfer Protocol (SMTP); and may support one or more lower level communications standards or protocols such as, for example, the 10 Gigabit Ethernet standard, the Fibre Channel standards, one or more varieties of the IEEE 802 Ethernet standards, Asynchronous Transfer Mode (ATM), X.25, Integrated Services Digital Network (ISDN), token ring, frame relay, Point to Point Protocol (PPP), Fiber Distributed Data Interface (FDDI), and proprietary and other protocols.

The term network card encompasses line cards, test cards, analysis cards, network line cards, load modules, interface cards, network interface cards, data interface cards, packet engine cards, service cards, smart cards, switch cards, relay access cards, CPU cards, port cards, and others. The network cards may be referred to as blades. The network cards 114, 124 may include one or more computer processors, field programmable gate arrays (FPGA), application specific integrated circuits (ASIC), programmable logic devices (PLD), programmable logic arrays (PLA), processors and other kinds of devices. The network cards may include memory such as, for example, random access memory (RAM). In addition, the network cards 114, 124 may include software and/or firmware.

At least one network card 114, 124 in each of the traffic generator 110 and the traffic receiver 120 may include a circuit, chip or chip set that allows for communication over a network as one or more network capable devices. A network capable device is any device that may communicate over the network 140. The network cards 114, 124 may be connected to the network 140 through one or more connections 118, 218 which may be wire lines, optical fiber cables, wirelessly and otherwise. Although only one each of the connections 118, 218 are shown, multiple connections with the network 140 may exist from the traffic generator 110, the traffic receiver 120 and the network cards 114, 124. Each network card 114, 124 may support a single communications protocol, may support a number of related protocols, or may support a number of unrelated protocols. The network cards 114, 124 may be permanently installed in the traffic generator 110 and the traffic receiver 120, may be removable, or may be a combination thereof. One or more of the network cards 114, 124 may have a resident operating system included thereon, such as, for example, a version of the Linux operating system. The traffic generator 110 and the traffic receiver 120 may include a CPU card that allows the chassis to also serve as a computer workstation.

The back planes 112, 122 may serve as a bus or communications medium for the network cards 114, 124. The back planes 112, 122 may also provide power to the network cards 114, 124.

The traffic generator 110 and the traffic receiver 120 as well as one or more of the network cards 114, 124 may include software that executes to achieve the techniques described herein. As used herein, the term software involves any instructions that may be executed on a computer processor of any kind. The software may be implemented in any computer language, and may be executed as object code, may be assembly or machine code, a combination of these, and others. The term application refers to one or more software modules, software routines or software programs and combinations thereof. A suite includes one or more software applications, software modules, software routines or software programs and combinations thereof. The techniques described herein may be implemented as software in the form of one or more applications and suites and may include lower level drivers, object code, and other lower level software.

The software may be stored on and executed from any local or remote machine readable medium such as, for example, without limitation, magnetic media (e.g., hard disks, tape, floppy disks), optical media (e.g., CD, DVD), flash memory products (e.g., memory stick, compact flash and others), and volatile and non-volatile silicon memory products (e.g., random access memory (RAM), programmable read-only memory (PROM), electronically erasable programmable read-only memory (EEPROM), and others). A storage device is any device that allows for the reading from and/or writing to a machine readable medium.

The traffic generator 110 and the traffic receiver 120 may each be augmented by or replaced by one or more computing devices having network cards included therein, including, but not limited to, personal computers and computer workstations.

A flow of data units originating from a single source on the network having a specific type of data unit and a specific rate will be referred to herein as a "stream." A stream's rate may be a function of time or other variables. A source may support multiple outgoing and incoming streams simultaneously and concurrently, for example to accommodate multiple data unit types or rates. A source may be, for example, a port on a network interface. A single stream may represent one or more concurrent "sessions." A "session" is a lasting connection between a fixed, single source, and a fixed, single destination comprising a sequence of one or more data units. The sessions within a stream share the data rate of the stream through interleaving. The interleaving may be balanced, unbalanced, and distributed among the represented sessions.

Figure 2:
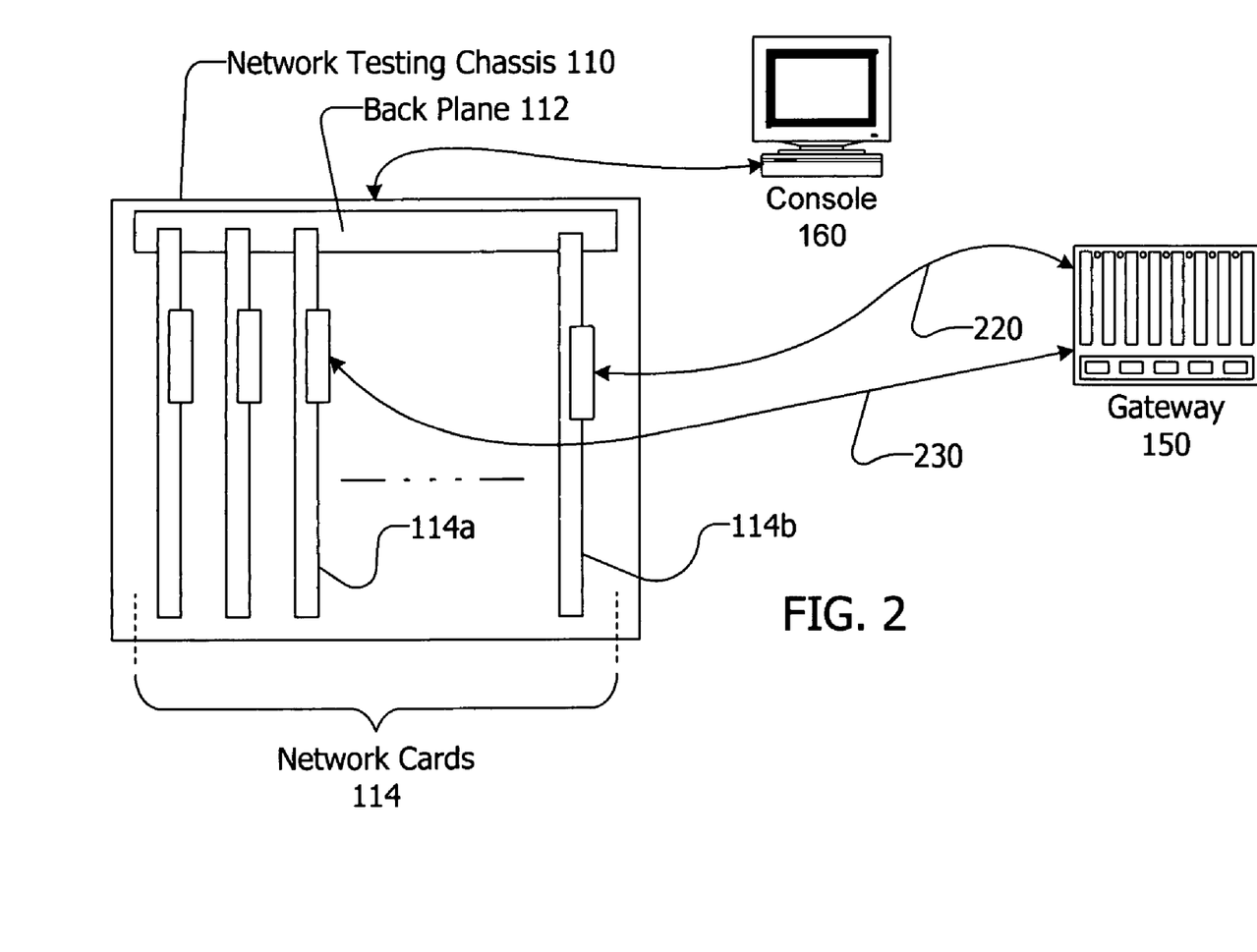
FIG. 2 is a block diagram of a second environment for generating processed traffic.

Referring now to FIG. 2, there is shown a block diagram of a second environment in accordance with the invention. Using such an environment, tests of the gateway 150 may also be performed without the network 140 or the traffic receiver 120. In such a case, the traffic generator 110 simulates both the transmitting hosts and the receiving hosts. For example, one card 114a of the traffic generator 110 may simulate transmitting hosts, and a second card 114b of the traffic generator 110 may simulate the receiving hosts. In such a case, the gateway 150 might have separate physical or logical connections 220, 230 to the two different cards 114a, 114b of the traffic generator 110. As an alternative, both a traffic generator 110 and a traffic receiver 120 may be connected to the gateway 150.

Figure 3:
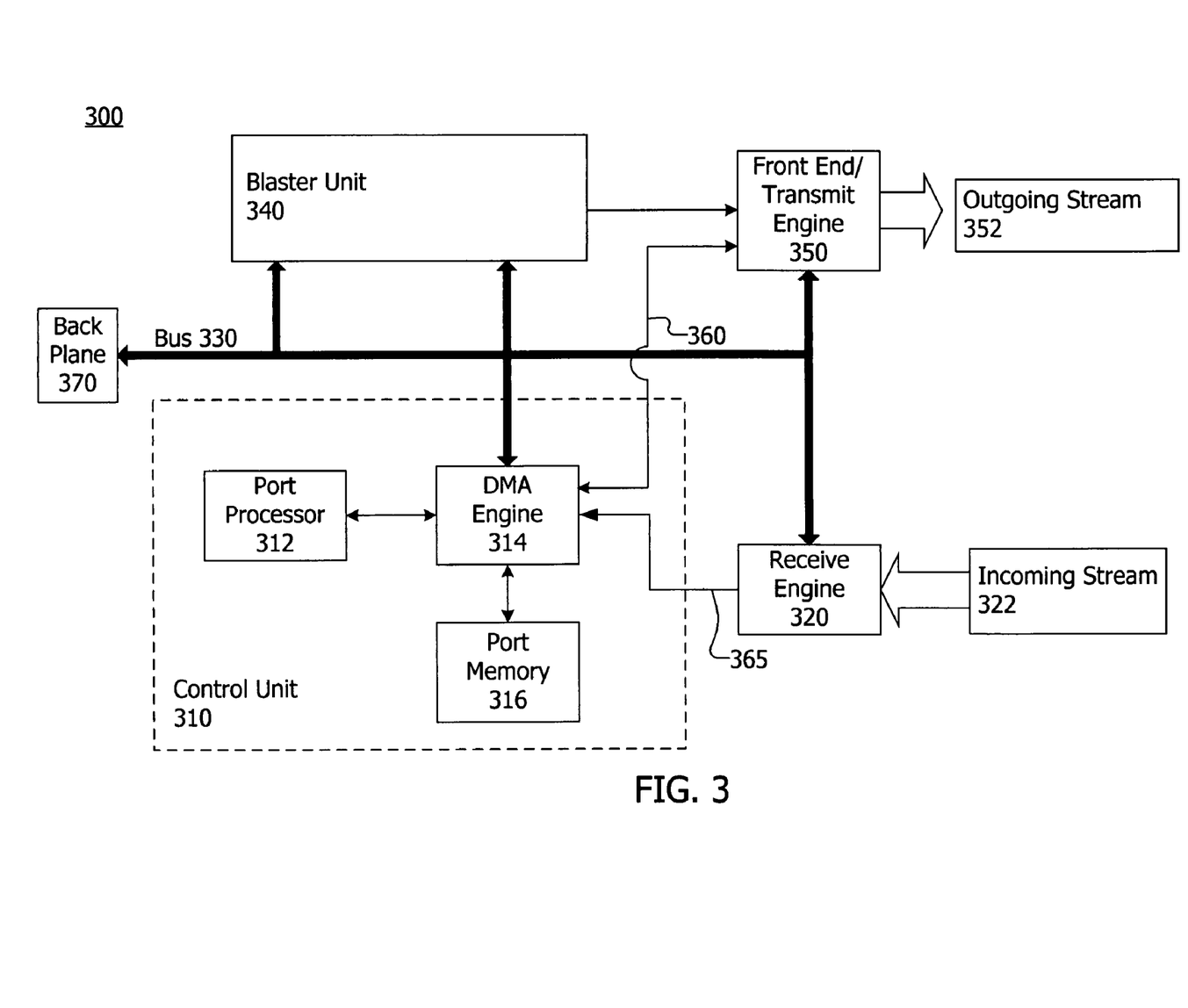
FIG. 3 is a block diagram of an apparatus for generating processed traffic.

Referring now to FIG. 3, there is shown a block diagram of an apparatus 300 according to one aspect of the invention. The apparatus 300 may be the traffic generator 110, the traffic receiver 120 (FIG. 1), the network cards 114, 124, or one or more components of the traffic generator 110 and the traffic receiver 120 or the network cards 114, 124, such as a port. The apparatus 300 includes a control unit 310, a blaster unit 340, a receive engine 320, a front end/transmit engine 350, a bus 330, a control line 360 and a back plane 370. The control unit 310 may include a port processor 312, a DMA (direct memory access) engine 314, and a port memory 316. The control unit 310, the blaster unit 340, the receive engine 320 and the front end/transmit engine 350 may be hardware, software, firmware, or a combination thereof. Additional and fewer units, modules or other arrangement of software, hardware and data structures may be used to achieve the apparatus 300.

The bus 330 provides a communications path between the control unit 310, the receive engine 320, the blaster unit 340, the front end/transmit engine 350 and the back plane 370. The bus 330 may be used for communicating control and status information, and also data. Communication paths 360, 365 may be used for communicating data, and also control and status information.

The port processor 312 may be a microprocessor or other programmable processor. From outside the apparatus, the port processor 312 receives control instructions such as patterns of traffic which the apparatus is to generate. The control instructions may be received from a network device over an incoming stream 322. Alternatively, the control instructions may be provided directly to the apparatus via the bus 330, for example via the back plane 370. The port processor 312 may have an application program interface (API) for external control of the apparatus. A user may use a software program on a host to enter commands which create the control instructions that are sent to the port processor 312. The control unit 310 may store the control instructions in port memory 316 before, after, and during their execution.

The DMA engine 314 comprises an interface and control logic providing demand memory access. The DMA engine 314 is coupled to the port processor 312, the port memory 316, the receive engine 320 and the bus 330. In response to requests from the port processor 312, the DMA engine 314 fetches data units and data from the port memory 316. The DMA engine 314 also provides a path from the port processor 312 to the blaster unit 340 and the front end/transmit engine 350.

The receive engine 320 receives incoming data streams, such as stream 322. The incoming stream 322 may represent plural sessions. The receive engine 320 may process incoming data units according to a filter provided by or controlled by the port processor 312. After receiving the incoming data units, the receive engine 320 passes the data units to the DMA engine 314, which may store the data units in the port memory 316 or pass them directly to the port processor 312. The receive engine may communicate with the DMA engine 314 via bus 330 and/or communication line 365. Incoming data units may also be discarded, for example by either the receive engine 320 (e.g., filtered out) or the DMA engine 314. Incoming data units may include control data from a network device, e.g., for negotiating, setting up, tearing down or controlling a session. Incoming data units may also include data from a network device.

The front end/transmit engine 350 transmits outgoing data units as one or more streams 352. The data stream 352 may represent plural sessions. The data units which the front end/transmit engine 350 transmits may originate from the control unit 310 or the blaster unit 340. The control unit 310 originates control data for negotiating, setting up, tearing down and controlling streams and sessions. The front end/transmit engine 350 is coupled to the bus 330 and communications line 365 for receiving control information and data units.

The blaster unit 340 may form data units and pass these data units to the front end/transmit engine 350. The blaster unit 340 uses session configuration information, comprising instructions for forming and timing transmission of the outgoing data units. The blaster unit 340 may receive the session configuration information from the port processor 312.

The apparatus 300 may implement a full IPSEC and IKE protocol stack. The apparatus 300 may emulate thousands of secure gateways and clients, creating thousands of IPSEC tunnels. Each tunnel may have a unique source IP address creating realistic scenarios.

The environments of FIG. 1 and FIG. 2 and apparatus of FIG. 3 may be used for numerous test suites. These may include:

Tunnel Capacity: Measures the maximum number of concurrent tunnels that can be sustained by the device under test (DUT).

Tunnel Setup: Measures the rate at which tunnels are set up by the DUT.

Encryption/Decryption Latency: Measures the minimum, maximum, and average encryption and decryption latency when traffic is sent over the tunnels through the DUT.

Throughput and Loss: Layer 4-7 traffic is sent over each established tunnel and statistics are measured for throughput and packet loss.

Real-Time, Per-Tunnel Statistics and Diagnostics: A report of statistics in real-time in a graphical format.

Description of the Methods

Figure 4:
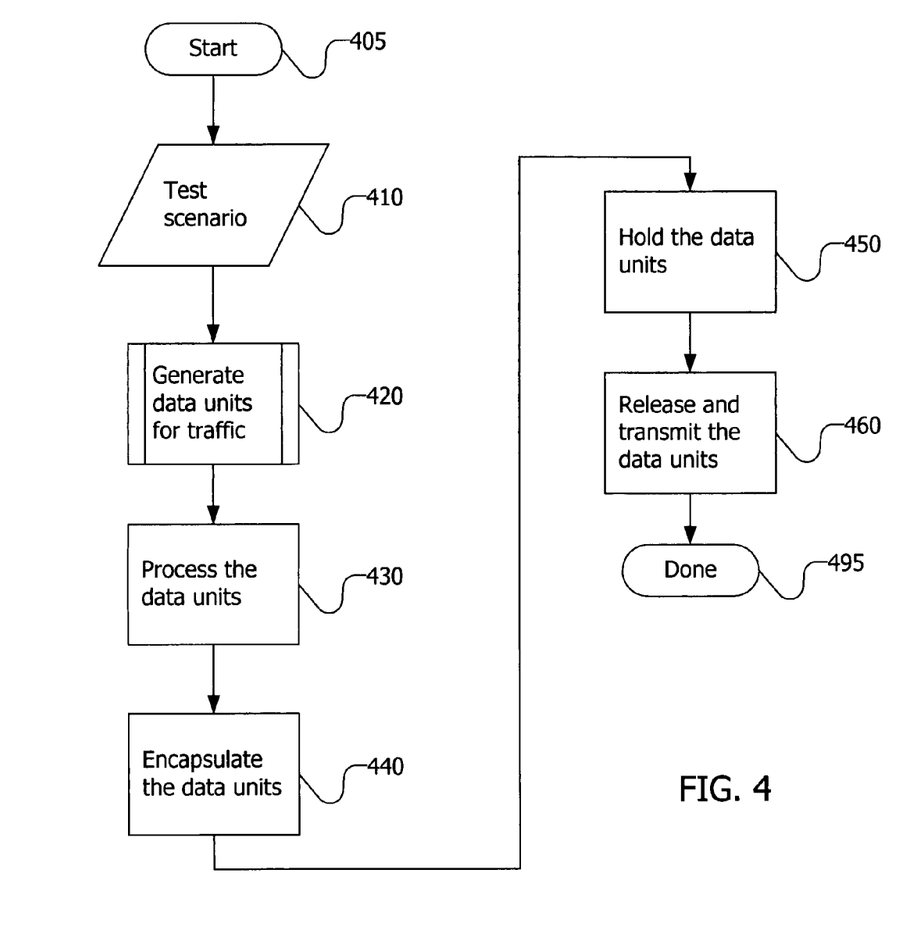
FIG. 4 is a flow chart of a method of generating processed traffic.

Referring now to FIG. 4 there is shown a flow chart of a method of generating processed traffic. The traffic may be considered simulated real-time processed traffic or simulated live processed traffic. As will be appreciated, according to the methods of the invention, end points pre-compute stimuli/responses to avoid doing so on demand. Hence, the DUT (e.g., the gateway 150 of FIG. 1) is deceived as to the time of the processing. Concealing the time of the data operations allows simulation of more complex systems of potentially more powerful processors, for example arranged in a pipeline (compress>encapsulate>encrypt>authenticate).

In a first step, a test scenario for generating a stream of traffic is provided (step 410). The test scenario may originate from the console 160 and be loaded into the traffic generator 110. The test scenario, for example, may seek to test the one-way processing capability of the gateway 150. An application on the traffic generator 110 (acting as both endpoint and gateway) may generate and transmit data units. An application on the traffic receiver 120 may listen for this traffic and record its receipt.

The test scenario may specify a type of processing to be performed by the traffic generator 110 on the traffic prior to transmission. The test scenario may specify transmission rates or speeds, as well as protocols and transmission paths to be used. The traffic may be for transmission to a designated endpoint. The traffic may comprise plural data units.

The traffic generator 110 generates data units in accordance with the test scenario (step 420). The data units may include an address and a payload. The data units may be generated at a "generation rate." This generation rate may be determined or influenced by available processing resources such as capabilities of the processor 312, the speed and size of the port memory, and the traffic generator's internal data transfer bandwidth.

Alternatively to step 420, the traffic generator 110 may receive the traffic from a source endpoint. The traffic from the source endpoint may be carried on a physically secure connection to the traffic generator 110.

The traffic generator 110 processes the generated traffic (step 430). This processing may be on a data unit basis, or less granular. The generated data units may be processed at a "processing rate." The processing may be application-layer processing. In the OSI model, the processing 430 may take place at layer 7. The entire data unit or just the payload may be processed.

The processing may be intensive. Processor intensive processing includes: encryption; encapsulation; network address translation; proxying; compression; forward error correction; multi-resolution source codecs; digital signal processing: translation of analog to digital (voice/video/waveform), voice over IP, and medical imaging. All of these may require various degree of computation that would slow down a source but which could be pre-computed to simulate a more powerful processor.

In conjunction with the processing, the data units may be encapsulated (step 440). Encapsulation may be performed as part of processing or as an adjunct. The data units may be encapsulated at an "encapsulation rate." Encapsulation may be desirable, for example, when the entire generated data units are processed, so that the destination addressed may be preserved or desirably altered.

The processing 430 may be significant and may severely limit the rate at which traffic can be transmitted. Thus, the processed data units may be held (step 450). In this step 450, data units may be accumulated in a memory, such as the port memory 316 or within the blaster unit 340. The traffic generator 110 may hold the processed traffic until a quantity of traffic is available for transmission.

The quantity of traffic to hold may be determined in a number of ways. The quantity of traffic may be a predetermined amount. The quantity of traffic may be an amount sufficient to create a stream of desired speed and length. The test scenario may dictate particular traffic flows, and the traffic generator 110 may hold processed traffic a number of times over a period of time to accommodate the test scenario.

Once a sufficient amount of traffic has been held, it can then be "released" and transmitted at a specific rate. The held data units may be released and transmitted as a stream of traffic or burst on the network 140 (step 460). The data units may be released at a "release rate," and transmitted at a "transmission rate." The transmission rate can be significantly higher than without the holding step 450 because the held traffic is not subject to processing. A longer stream may be produced through pipelining. While the traffic generator 110 is streaming data to the traffic receiver 120, the traffic generator may generate more data for transmission.

The processed traffic may be held in a number of ways. For example, after the generated traffic is processed (and possibly encapsulated), the processed traffic may be simply stored in a buffer.

Transmission of the data units may be to the designated endpoint, such as a port in the traffic receiver 120. The connection from the traffic generator 110 through the network 140 and the gateway 150 to the traffic receiver 120 may be a physically insecure. By encrypting and encapsulating the traffic, a secure tunnel to the traffic receiver 120 may be obtained.

By holding the data units, differences between the processing rate (which may include the encapsulation rate) may be arbitrated against the transmission rate. Thus, if the transmission rate is greater than the processing rate, then data units may be held until a sufficient quantity are available to support the transmission rate. Thus, processed traffic may be held until a predefined amount of processed traffic has accumulated. In addition, the processing rate appears to be the same as the transmission rate, so the apparent processing rate may be significantly higher than the real processing rate.

The amount of traffic or data units to held may be determined as follows:

$$A >= r*t,$$

where A is the amount of traffic or data units to hold, r is the transmission rate and t is the length in time of the transmission.

In the OSI model, communications at layers 4-7 may be stateful or stateless, whereas communications at layers 1-3 are stateless. In some embodiments, it may be necessary to limit processing to stateless communications, or to traffic where statefulness is not important.

With regard to FIG. 4, additional and fewer steps may be taken, and the steps as shown may be combined or further refined to achieve the methods described herein.

Figure 5:
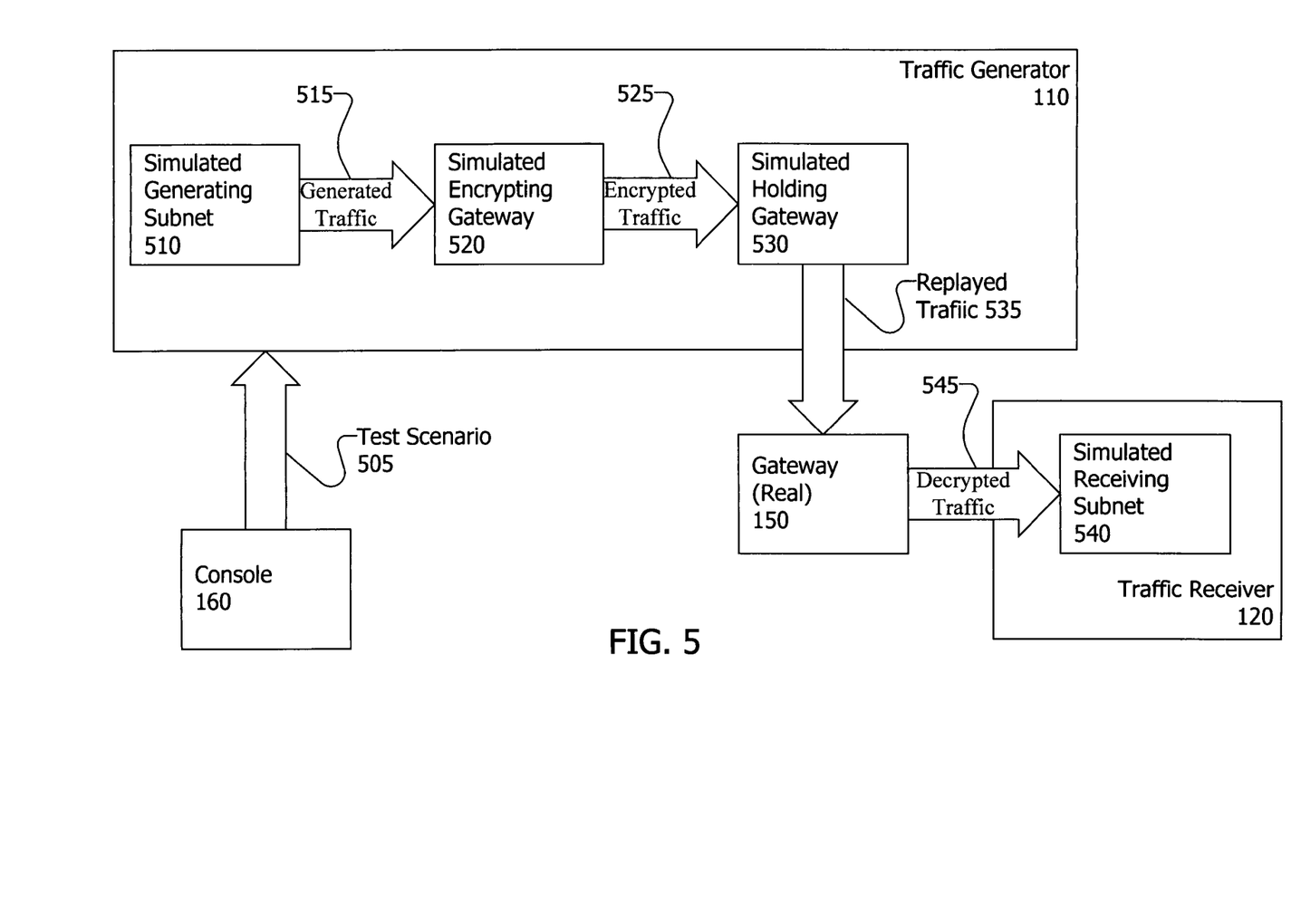
FIG. 5 is a data flow diagram of a method of generating processed traffic.

Referring now to FIG. 5, there is shown a data flow diagram of the method of generating processed traffic. In FIG. 5, a test scenario 505 specifies that the processing of step 430 is encryption, such as with IPSEC. The test scenario 505 also specifies that one or more hosts of a simulated generating subnet 510 of the traffic generator 110 should send traffic to one or more hosts within a simulated receiving subnet 540 of the traffic receiver 120.

The traffic generator 110 is configured to provide a simulated encrypting gateway 520. In an IP environment, the simulated encrypting gateway 520 has an IP address configured as protecting the simulated generating subnet 510. Thus, generated traffic 515 from the simulated generating subnet 510 goes to the simulated encrypting gateway 520. The simulated encrypting gateway 520 encrypts the traffic, encapsulates the encrypted traffic to go to the real gateway 150 and transmits the encapsulated traffic 525 to the address of the real gateway 150. However, the encapsulated traffic 525 does not go directly to the real gateway 150.

Instead, the encrypted traffic 525 is looped back within the traffic generator 110. The traffic generator 110 is configured to provided a simulated holding gateway 530. In an IP environment, the simulated holding gateway 520 has an IP address configured as protecting the subnet 540. The simulated holding gateway 530 may be assigned an alias IP address which is the IP address of the real gateway 150. Thus, the encrypted traffic 525 is diverted from the real gateway 150 to the simulated holding gateway 530. To achieve the diversion, the destination MAC addresses of each data unit may be rewritten to the MAC address of the simulated holding gateway 530. In other words, the traffic generator 110 loops back the encrypted traffic 525, and the encrypted traffic 525 is not transmitted to the real gateway 150.

The simulated holding gateway 530 may capture and store the encrypted traffic 525 from the simulated encrypting gateway 520. When a sufficient amount of encrypted traffic 525 has been held, the simulated holding gateway 530 may be removed and the captured traffic released. The released traffic 535 is transmitted to the real gateway 150.

The real gateway 150 may process the released traffic 535. The gateway 150 may be a decryption gateway, and may decrypt and decapsulate the encrypted and encapsulated traffic from the traffic generator 110. The real gateway may then transmit the decrypted traffic 545 to the simulated receiving subnet 540.

The traffic receiver 120 may receive the decrypted traffic 545 at a "receipt rate." The capability of the real gateway 150 to process and forward traffic may exceed the ability of the traffic receiver 120 to receive and remark the receipt of traffic. Therefore, it may be desirable to buffer the decrypted traffic 545 on the traffic receiver 120 and process the receipts only when the burst is complete.

The traffic receiver 120 may hold the decrypted traffic 545. Subsequently, the received traffic 545 may be analyzed. This analysis may take place in user space. Processing and analyzing may be performed at a rate which is less than the receipt rate. However, instead of holding the entire stream until the stream is closed, portions of the stream may be held by the traffic receiver 120 and then analyzed. While one portion of traffic is being analyzed, another portion may be held for subsequent analysis. Accordingly, results of analysis may be obtained prior to receipt of the entire stream. In addition to or in lieu of analysis, other processing may be performed by the traffic receiver 120.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

For example, although FIG. 5 shows data flow from left to right, the data could flow from right to left. Such a configuration could be used to test the ability of the gateway 150 to encrypt and encapsulate traffic. In such a configuration, the traffic receiver 120 would generate traffic, and the traffic generator 110 would receive the traffic from the gateway 150. In an IP environment, the simulated encrypting gateway 520 might have an IP address configured as protecting the subnet 510. That is, the traffic generator 110 lies logically or physically on the routed path between the traffic receiver 110 and the addressee. The simulated holding gateway 530 may be assigned an alias IP address which is the IP address of the simulated encrypting gateway 520. Thus, encrypted traffic received by the traffic generator 110 would be held by the simulated holding gateway 530 and then looped back to the simulated encrypting gateway 520 for decryption and decapsulation.

The invention claimed is:

1. A method of generating processed traffic, the method comprising
   providing a test scenario for generating a stream of encrypted traffic
   generating data units in accordance with the test scenario at a first rate
   encrypting the data units at a second rate
   encapsulating the data units at a third rate
   holding the encapsulated data units
   releasing and transmitting at a fourth rate the held data units as the stream of encrypted traffic
   wherein the fourth rate is greater than a sum of the first rate, the second rate and the third rate.

2. The method of generating processed traffic of claim 1 wherein the test scenario specifies that the traffic should be sent to at least one host within a receiving subnet protected by a first gateway having an address, the method further comprising
   providing a holding gateway having an address configured as protecting the receiving subnet
   transmitting the encrypted traffic to the address of the first gateway
   diverting the encrypted traffic from the first gateway to the holding gateway
   the holding gateway capturing the encrypted traffic, and causing the captured traffic to be stored
   when a sufficient amount of stored traffic has been stored removing the holding gateway
   releasing the captured traffic, whereby the released traffic is transmitted to the first gateway.

3. The method of generating processed traffic of claim 2 wherein the holding gateway has an alias address which is the same as the address of the first gateway.

4. The method of generating processed traffic of claim 2 wherein the test scenario specifies that the traffic should be sent from at least one host within a generating subnet, the method further comprising
   providing an encrypting gateway having an address configured as protecting the generating subnet the encrypting gateway
encrypting the traffic
encapsulating the encrypted traffic to go to the first gateway.

5. A method of generating processed traffic, the method comprising
providing traffic comprising plural data units, the traffic for transmission to first endpoint
processing the provided traffic
holding the processed traffic until a predefined amount of processed traffic has accumulated
releasing the held traffic for transmission to the first endpoint
wherein the predefined amount (A) is determined according to A>=r*t, wherein
r is the rate of transmission
t is a length in time of the transmission.

6. The method of generating processed traffic of claim 5 wherein the processing comprises encrypting at least part of the data units.

7. The method of generating processed traffic of claim 5 further comprising transmitting the held traffic at a first rate, wherein the first rate is greater than a second rate for providing the traffic and processing the provided traffic.

8. The method of generating processed traffic of claim 5 wherein the processing comprises application-layer processing.

9. An apparatus for generating processed traffic, the apparatus comprising:
a processor
a memory
wherein the processor and the memory comprise circuits and software for
receiving a test scenario for generating a stream of encrypted traffic
generating data units in accordance with the test scenario at a first rate
encrypting the data units at a second rate
encapsulating the data units at a third rate
holding the encapsulated data units
releasing and transmitting at a fourth rate the held data units as the stream of encrypted traffic
wherein the fourth rate is greater than a sum of the first rate, the second rate and the third rate.

10. The apparatus for generating processed traffic of claim 9 wherein the test scenario specifies that the traffic should be sent to at least one host within a receiving subnet protected by a first gateway having an address, the processor and the memory comprising circuits and software further for
providing a holding gateway having an address configured as protecting the receiving subnet
transmitting the encrypted traffic to the address of the first gateway
diverting the encrypted traffic from the first gateway to the holding gateway
the holding gateway capturing the encrypted traffic, and causing the captured traffic to be stored
when a sufficient amount of stored traffic has been stored
removing the holding gateway
releasing the captured traffic, whereby the released traffic is transmitted to the first gateway.

11. The apparatus for generating processed traffic of claim 10 wherein the holding gateway has an alias address which is the same as the address of the first gateway.

12. The apparatus for generating processed traffic of claim 10 wherein the test scenario specifies that the traffic should be sent from at least one host within a generating subnet, the processor and the memory comprising circuits and software further for
providing an encrypting gateway having an address configured as protecting the generating subnet
the encrypting gateway
encrypting the traffic
encapsulating the encrypted traffic to go to the first gateway.

13. An apparatus for generating processed traffic, the apparatus comprising:
a processor
a memory
wherein the processor and the memory comprise circuits and software for
providing traffic comprising plural data units, the traffic for transmission to a first endpoint
processing the provided traffic
holding the processed traffic until a predefined amount of processed traffic has accumulated
releasing the held traffic for transmission to the first endpoint
wherein the predefined amount (A) is determined according to A>=r*t, wherein
r is the rate of transmission
t is a length in time of the transmission.

14. The apparatus for generating processed traffic of claim 13 wherein the processing comprises encrypting at least part of the data units.

15. The apparatus for generating processed traffic of claim 13, the processor and the memory comprising circuits and software further for transmitting the held traffic at a first rate, wherein the first rate is greater than a second rate for providing the traffic and processing the provided traffic.

16. The apparatus for generating processed traffic of claim 13 wherein the processing comprises application-layer processing.

17. A storage medium having instructions stored thereon which when executed by a processor cause the processor to generate processed traffic comprising:
receiving a test scenario for generating a stream of encrypted traffic
generating data units in accordance with the test scenario at a first rate
encrypting the data units at a second rate
encapsulating the data units at a third rate
holding the encapsulated data units
releasing and transmitting at a fourth rate the held data units as the stream of encrypted traffic
wherein the fourth rate is greater than a sum of the first rate, the second rate and the third rate.

18. The storage medium of claim 17 wherein the test scenario specifies that the traffic should be sent to at least one host within a receiving subnet protected by a first gateway having an address, the instructions further for
providing a holding gateway having an address configured as protecting the receiving subnet
transmitting the encrypted traffic to the address of the first gateway
diverting the encrypted traffic from the first gateway to the holding gateway
the holding gateway capturing the encrypted traffic, and causing the captured traffic to be stored
when a sufficient amount of stored traffic has been stored
removing the holding gateway
releasing the captured traffic, whereby the released traffic is transmitted to the first gateway.

19. The storage medium of claim 18 wherein the holding gateway has an alias address which is the same as the address of the first gateway.

20. The storage medium of claim 18 wherein the test scenario specifies that the traffic should be sent from at least one host within a generating subnet, the instructions further for
   providing an encrypting gateway having an address configured as protecting the generating subnet
   the encrypting gateway
      encrypting the traffic
      encapsulating the encrypted traffic to go to the first gateway.

21. A storage medium having instructions stored thereon which when executed by a processor cause the processor to generate processed traffic comprising:
   providing traffic for transmission to a first endpoint, the traffic comprising plural data units
   processing the provided traffic
   holding the processed traffic until a predefined amount of processed traffic has accumulated
   releasing the held traffic for transmission to the first endpoint
   wherein the predefined amount (A) is determined according to A>=r*t, wherein
      r is the rate of transmission
      t is a length in time of the transmission.

22. The storage medium of claim 21 wherein the processing comprises encrypting at least part of the data units.

23. The storage medium of claim 21, the instructions further for transmitting the held traffic at a first rate, wherein the first rate is greater than a second rate for providing the traffic and processing the provided traffic.

24. The storage medium of claim 21 wherein the processing comprises application-layer processing.

25. A computing device to generate processed traffic, the computing device comprising:
   a processor
   a memory coupled with the processor
   a storage medium having instructions stored thereon which when executed cause the computing device to perform actions comprising
      receiving a test scenario for generating a stream of encrypted traffic
      generating data units in accordance with the test scenario at a first rate
      encrypting the data units at a second rate
      encapsulating the data units at a third rate
      holding the encapsulated data units
      releasing and transmitting at a fourth rate the held data units as the stream of encrypted traffic
   wherein the fourth rate is greater than a sum of the first rate, the second rate and the third rate.

26. The computing device to generate processed traffic of claim 25 wherein the test scenario specifies that the traffic should be sent to at least one host within a receiving subnet protected by a first gateway having an address, the instructions further for
   providing a holding gateway having an address configured as protecting the receiving subnet
   transmitting the encrypted traffic to the address of the first gateway
   diverting the encrypted traffic from the first gateway to the holding gateway
   the holding gateway capturing the encrypted traffic, and causing the captured traffic to be stored
   when a sufficient amount of stored traffic has been stored
      removing the holding gateway
      releasing the captured traffic, whereby the released traffic is transmitted to the first gateway.

27. The computing device to generate processed traffic of claim 26 wherein the holding gateway has an alias address which is the same as the address of the first gateway.

28. The computing device to generate processed traffic of claim 26 wherein the test scenario specifies that the traffic should be sent from at least one host within a generating subnet, the instructions further for
   providing an encrypting gateway having an address configured as protecting the generating subnet
   the encrypting gateway
      encrypting the traffic
      encapsulating the encrypted traffic to go to the first gateway.

29. A computing device to generate processed traffic, the computing device comprising:
   a processor
   a memory coupled with the processor
   a storage medium having instructions stored thereon which when executed cause the computing device to perform actions comprising
      receiving traffic comprising plural data units, the traffic for transmission to a first endpoint
      processing the provided traffic
      holding the processed traffic until a predefined amount of processed traffic has accumulated
      releasing the held traffic for transmission to the first endpoint
   wherein the predefined amount (A) is determined according to A>=r*t, wherein
      r is the rate of transmission
      t is a length in time of the transmission.

30. The computing device to generate processed traffic of claim 29 wherein the processing comprises encrypting at least part of the data units.

31. The computing device to generate processed traffic of claim 29, the instructions further for transmitting the held traffic at a first rate, wherein the first rate is greater than a second rate for providing the traffic and processing the provided traffic.

32. The computing device to generate processed traffic of claim 29 wherein the processing comprises application-layer processing.

* * * * *